(12) United States Patent
Donlagic et al.

(10) Patent No.: US 10,101,202 B2
(45) Date of Patent: *Oct. 16, 2018

(54) FIBER-OPTIC MEASUREMENT SYSTEM AND METHODS BASED ON ULTRA-SHORT CAVITY LENGTH FABRY-PEROT SENSORS AND LOW RESOLUTION SPECTRUM ANALYSIS

(71) Applicant: University of Maribor, Maribor (SI)

(72) Inventors: Denis Donlagic, Maribor (SI); Simon Pevec, Podcetrtek (SI)

(73) Assignee: University of Maribor, Maribor (SI)

( * ) Notice: Subject to any disclaimer, the term of this patent is extended or adjusted under 35 U.S.C. 154(b) by 0 days.

This patent is subject to a terminal disclaimer.

(21) Appl. No.: 15/598,152

(22) Filed: May 17, 2017

(65) Prior Publication Data

US 2017/0336255 A1 Nov. 23, 2017

Related U.S. Application Data

(63) Continuation of application No. 14/010,675, filed on Aug. 27, 2013, now Pat. No. 9,677,933.

(Continued)

(51) Int. Cl.
| | |
|---|---|
| *G01D 5/353* | (2006.01) |
| *G01J 3/02* | (2006.01) |
| *G01J 3/28* | (2006.01) |
| *G01J 3/10* | (2006.01) |
| *G01L 9/00* | (2006.01) |
| *G01J 3/26* | (2006.01) |
| *G01J 3/32* | (2006.01) |

(Continued)

(52) U.S. Cl.
CPC .......... *G01J 3/0218* (2013.01); *G01J 3/0208* (2013.01); *G01J 3/0224* (2013.01); *G01J 3/0237* (2013.01); *G01J 3/0289* (2013.01); *G01J 3/10* (2013.01); *G01J 3/26* (2013.01); *G01J 3/28* (2013.01); *G01J 3/2803* (2013.01); *G01J 3/32* (2013.01); *G01J 3/42* (2013.01); *G01J 3/427* (2013.01); *G01L 9/0079* (2013.01); *G01B 2290/25* (2013.01); *G01J 2003/102* (2013.01); *G01J 2003/104* (2013.01)

(58) Field of Classification Search
CPC .............. G01D 5/353; G01D 5/35303; G01D 5/35312; G01J 3/26; G01J 3/45
See application file for complete search history.

(56) References Cited

U.S. PATENT DOCUMENTS

| | | |
|---|---|---|
| 5,301,001 A | 4/1994 | Murphy et al. |
| 7,684,657 B2 | 3/2010 | Donlagic et al. |

(Continued)

OTHER PUBLICATIONS

Njegovec et al., U.S. Appl. No. 13/762,112, filed Feb. 7, 2013.

(Continued)

*Primary Examiner* — Jonathan Hansen
(74) *Attorney, Agent, or Firm* — Dugan & Dugan, PC

(57) ABSTRACT

An optical system having an optical sensor with an ultra-short FP cavity, and a low-resolution optical interrogation system coupled to the optical sensor and operational to send light signals and receive light signals to and from the optical sensor is disclosed. The optical system may operate in a wavelength range including the visible and near-infrared range. Optical assemblies and methods of interrogating optical sensors are provided, as are numerous other aspects.

18 Claims, 9 Drawing Sheets

Related U.S. Application Data

(60) Provisional application No. 61/694,902, filed on Aug. 30, 2012.

(51) Int. Cl.
 *G01J 3/42* (2006.01)
 *G01J 3/427* (2006.01)

(56) References Cited

U.S. PATENT DOCUMENTS

| | | |
|---|---|---|
| 9,677,933 B2* | 6/2017 | Donlagic .............. G01L 9/0079 |
| 2002/0003917 A1* | 1/2002 | Sherrer ................ G01L 9/0079 |
| | | 385/12 |
| 2008/0055604 A1 | 3/2008 | Sapan |
| 2008/0226217 A1* | 9/2008 | Kilic ...................... G01H 9/004 |
| | | 385/12 |
| 2011/0249973 A1 | 10/2011 | Donlagic |
| 2012/0229793 A1 | 9/2012 | Donlagic et al. |
| 2014/0168659 A1 | 6/2014 | Suri |
| 2016/0025562 A1 | 1/2016 | Donlagic et al. |

OTHER PUBLICATIONS

Pevic et al., "All-fiber, long-active-length Fabry-Perot strain sensor," Opt. express, 2011, vol. 19, No. 16, pp. 15641-15651.

Non-Final Office Action of U.S. Appl. No. 14/010,675, dated Mar. 11, 2016.

Aug. 11, 2016 reply to Mar. 11, 2016 Non-Final Office Action of U.S. Appl. No. 14/010,675.

Final Office Action of U.S. Appl. No. 14/010,675 dated Oct. 21, 2016.

Notice of Allowance of U.S. Appl. No. 14/010,675 dated Feb. 10, 2017.

Jan. 23, 2017 Reply to Oct. 21, 2016 Final Office Action of U.S. Appl. No. 14/010,675.

E. Cibula and D. Donlagic, "In-line short cavity Fabry-perot strain sensor for quasi distributed measurement utilizing standard OTDR," Opt. Express 15(14), 8719-8730 (2007).

* cited by examiner

FIBER-OPTIC MEASUREMENT SYSTEM AND METHODS BASED ON ULTRA-SHORT CAVITY LENGTH FABRY-PEROT SENSORS AND LOW RESOLUTION SPECTRUM ANALYSIS

RELATED APPLICATIONS

The present application is a continuation of, and claims priority from, U.S. non-provisional patent application Ser. No. 14/010,675 entitled "FIBER-OPTIC MEASUREMENT SYSTEM AND METHODS BASED ON ULTRA-SHORT CAVITY LENGTH FABRY-PEROT SENSORS AND LOW RESOLUTION SPECTRUM ANALYSIS," which was filed Aug. 27, 2013, which claims priority from U.S. Provisional Patent Application Ser. No. 61/694,902, filed Aug. 30, 2012, entitled "FIBER-OPTIC MEASUREMENT SYSTEM AND METHODS BASED ON ULTRA-SHORT CAVITY LENGTH FABRY-PEROT SENSORS AND LOW RESOLUTION SPECTRUM ANALYSIS", each of which is hereby incorporated by reference herein in its entirety for all purposes.

FIELD

The present invention relates to sensors and measurement systems, more specifically to optical fiber sensors and methods for interrogation thereof.

BACKGROUND

Fiber-optic sensors (FOS) can provide many advantages over conventional sensing technologies. Whilst FOSs have been successfully introduced into specialized markets, such as oil and gas, civil-engineering, energy, military/aerospace, evaluation/testing and similar sectors, penetration into a broader range of widespread applications, such as general industrial, biomedical, automotive, consumer and similar sectors, may remain limited. These fields usually require low-complexity system-designs and good cost-to-performance-ratios that are difficult to reach with current FOS technologies. However, in general, complexity and cost limitations may not arise from fiber-sensors and fibers, but rather from the complex optoelectronic signal-processing used for sensor integration. It is common for the costs of signal-integration systems to exceed those of sensor and fiber costs by several orders of magnitude, for example.

Accordingly, to overcome these limitations in the future and to allow for broader usage of FOS technologies, new approaches to optoelectronic signal-processing are desired.

SUMMARY

According to first embodiment, an optical system is provided. The optical system includes an optical sensor having an ultra-short Fabry-Perot cavity, wherein the ultra-short Fabry-Perot cavity comprises a cavity length of shorter than 2.5 μm, and an optical interrogation system coupled to the optical sensor and operational to send light signals to the optical sensor and receive light signals from the optical sensor within a wavelength range of at least between 400 nm to 1100 nm, which includes visible and near-infrared range, wherein the optical interrogation system comprises a spectrally-sensitive detection system having a color detector adapted to receive the light signals and simultaneously detect light-intensity at more than one wavelength.

In an assembly embodiment, an optical assembly is provided. The optical assembly includes an optical sensor having an ultra-short Fabry-Perot cavity having an initial cavity length shorter than 2.5 μm, and an optical interrogation system coupled to the optical sensor and operational to send light signals to the optical sensor and receive light signals from the optical sensor within a wavelength range of at least between 400 nm to 1100 nm, which includes visible and near-infrared range, the optical interrogation system comprising a spectrally-sensitive detection system having a multi-color detector adapted to receive the light signals and simultaneously detect light-intensity at multiple wavelengths.

In a method embodiment, a method of interrogating an optical sensor is provided. The method includes providing an optical sensor having an ultra-short Fabry-Perot cavity, wherein the ultra-short Fabry-Perot cavity comprises a cavity length of shorter than 2.5 μm, and interrogating the optical sensor by sending light signals to and receiving light signals from the optical sensor within a wavelength range of at least between 400 nm to 1100 nm, which includes visible and near-infrared range, wherein the interrogating is carried out by an optical interrogation system comprising a spectrally-sensitive detection system having a color detector adapted to receive the light signals and simultaneously detect light-intensity at more than one wavelength.

Numerous other aspects are provided in accordance with these and other aspects of the invention. Other features and aspects of the present invention will become more fully apparent from the following detailed description, the appended claims, and the accompanying drawings.

DETAILED DESCRIPTION

Figure 1:
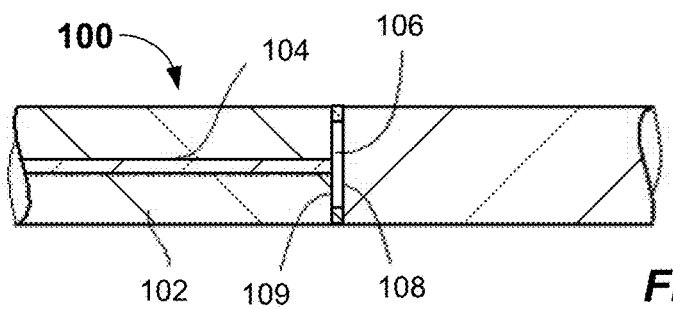
FIG. 1 illustrates a generic ultra-short cavity sensor, according to some embodiments.

Spectral-integration has proved to be one of the more accurate, reliable, and stable optical-fiber sensor integration methods. A spectrally-integrated sensor system consists of a sensor that changes its spectral characteristics under the influence of a sensing-parameter. Typical features that are observed regarding these spectral characteristics are, for example, positions of one or more local peaks. However, other features such as minimum or minima, slope or other features, can also be used for the purpose of sensing-parameter determination.

Typical, widespread examples of FOS that use this approach are fiber Bragg grating (FBGs) sensors. FBG is a periodic structure written within optical-fiber that reflects a characteristic optical-wavelength. This characteristic wavelength changes under the influence of a measured parameter, such as temperature or strain. In order to read, i.e. interrogate, such a FBG sensor, it is necessary to determine this characteristic wavelength. Therefore, the integration-system should consist of optical systems that can resolve and analyze back-reflected optical spectra. The resolution of the FBG sensor system will depend on the optical shape of the spectral characteristics (e.g. sharpens of the spectral peak), total system noise, the resolving capability of the analyzer/integrator, and the spectral sensitivity of the sensor.

Currently, the well-known FOS such as FBGs, Fabry-Perot (FP) sensors, and similar sensors provide relatively low spectral sensitivity. For example, a typical FBG will experience a shift of its characteristic's peak wavelength that corresponds to about 10 pm/C and 1 pm/µε. Thus, this means that a total shift of the peak wavelength over the entire sensor's operating range is usually within a 1 nm to 5 nm wavelength band. In order to achieve a useful resolution of such a sensor, a resolving capability of the spectrum analysis system should typically be very good. For example, the resolution should be within the picometer range (e.g., range of 1 pm to 10 pm). Thus, conventionally a grating-spectrometer having a complex, long working-distance, and a carefully designed optical design are used to achieve this high level of resolution. Accordingly, high cost, bulky/large volume design, and large mass are thus frequently associated with such high-resolution spectrometers. Alternatively, tunable laser sources are used to provide rapid laser-emission wavelength scanning over a desired wavelength range. Designs having external cavity resonators based upon wavelength tunable components in the laser's optical feedback are employed in the design of such a tunable laser. Again, this design is complex, relatively cost-inefficient and thus incompatible with many cost-driven applications. In summary, high-resolution spectroscopic systems are needed to integrate the great majority of existing spectrally-resolved FOS's. High-resolution spectroscopic systems are, however, have been associated with complex and cost-inefficient designs.

The solution to this unsolved cost-efficiency problem is provided by one or more embodiments of the invention by providing synergistic designs of the optical sensor and signal interrogation apparatus and methods. According to embodiments of the invention, such a solution can be obtained by the application of Fabry-Perot optical sensor with very short resonator cavity lengths, and the application of a cost-efficient, low-resolution spectrum analyzer systems, or even color analysis systems. By merging these two technologies, a high-resolution, efficient, and/or environmentally stable (e.g., temperature stable) FOS measurement system can be provided, and generally at much lower complexity and cost than currently existing solutions.

In particular, one or more of the above described problems are solved by implementing FOS's that exhibit significant changes in their spectral characteristics, so as to allow their spectral integration by application of simple spectrum analysis systems, such as miniature, low-resolution, low-cost spectrometers, or even a simple color detection systems, for example.

Miniature, low-resolution, low-cost spectrometers based on gratings and silicon-detector linear arrays have been continuously evolving. They have been successfully commercialized for more than two decades by companies such as Ocena-Optics Inc., USA, Hamamatsu, JP, and many others. Recent advances in micro-opto-electro-mechanical systems (MOEMS) have accentuated the production of these spectrometers on-the-chip in highly-integrated, compact, and very cost-efficient ways. Typically, these types of spectrometers operate within a visible and/or near-infrared range (e.g. between about 400 nm and about 1100 nm), and can typically reach spectral resolutions of only about 0.5 nm or worse, and more typically around 1 nm. Furthermore, they are usually adapted for operating with multimode fibers. The performances of these efficient spectrometers are unfortunately incompatible with most spectrally-resolved FOS's, such as conventional fiber Bragg gratings (FBG), Fabry-Perot interferometers (FPIs), and similar sensors, as already explained above.

In order to take advantage of these low-resolution spectrometers or even simpler spectrum or color-analysis systems, a class of FOS is used that provides large and significant changes in their spectral responses when exposed to measurement parameter change.

According to embodiments of the present invention, such optical sensors (e.g., a Fabry-Perot (FP) optical sensor or Fabry-Perot interferometers (FPIs)), which utilize optical cavities having ultra-short lengths. These and other embodiments of the present invention are further described with reference to FIGS. 1-19 below.

According to embodiments of the present invention, a generic FPI with an ultra-short cavity length, e.g. an ultra-short FP cavity sensor, is shown in FIG. 1. The optical sensor 100 consists of a lead-in fiber 102 that contains a core 104, which functions to guide light, and an ultra-short FP cavity 106. The ultra-short FP cavity 106 may be filled with air, other gases, liquid, or even solid material. The ultra-short FP cavity 106, as shown, is defined by spaced-apart, semi-reflective cavity walls 108 and 109. The optical sensor 100 is has a length of the ultra-short optical FP cavity 106 that is shorter than 2.5 µm, or even shorter than 1.5 µm in some embodiments, or even shorter than 1 µm in other embodiments. The cavity length is the distance between the cavity walls 108 and 109 as measured along a length direction of the lead-in fiber 102. Optical sensors 100 with such ultra-short FP cavities 106 can provide the following distinctive features that can directly affect the signal interrogation complexity.

First, short FP cavities, like ultra-short FP cavity 106 can have very broad spectral characteristics that are capable of being resolved or analyzed by a low-resolution spectrum analysis system. A low-resolution spectrum analysis system as used herein means resolution of 0.5 nm or worse. For example, the low-resolution spectrum analysis system may have a resolution of 0.5 nm to about 10 nm.

Second, and more importantly, the spectral characteristics of ultra-short FP cavities (e.g., ultra-short FP cavity 106) are very sensitive to cavity-length changes when exposed to the measure parameter (e.g., strain, load, pressure, temperature or the like). For example, shifting of a selected peak the in spectral characteristics of an FP resonator, caused by a change in length of the FP cavity is inversely proportional to the cavity length of the ultra-short FP cavity 106. Ultra-short FP cavities 106, e.g. cavities that have lengths comparable to the operating wavelength, may thus provide extremely high spectral sensitivities. For example, a nanometer change in the length of a 1 µm long, ultra-short FP cavity 106 will typical produce greater than a nanometer-shift in the position of a spectral peak (e.g., a first order peak) of the same cavity when observed within visible wavelength range.

Thirdly, very short FP cavities (e.g., ultra-short FP cavity 106) can be efficiently combined with multimode lead-in fibers, whilst providing good fringe contrasts and a reasonably clean spectral response. As was shown in the paper "Exact analysis of low-finesse multimode fiber-extrinsic Fabry-Perot interferometers," by M. Han and A. Wang, published in Applied Optics Vol. 43, pp. 4659-4666, the fringe visibility, as well as other sensor performance parameters increases as the cavity length decreases when multimode fiber is used as a lead-in fiber in FP sensors. This is mainly due to the fact that light inference only occurs in the same mode whereas different modes could mix when the reflected light is coupled back to the fiber (reduction of cavity length reduces this modal mixing).

Compatibility with multimode optical fibers is desired for efficient system design, since interrogation of those optical sensors with high spectral sensitivity and broad spectral characteristics requires broadband optical sources. Such a broadband optical-spectrum can be cost-efficiently obtained, for example by thermal (incandescent) sources or light emitting diodes (LEDs) that use indirect light-generation through phosphorus luminescence. As such, these light sources generate limited optical power per unit of surface area and possess very low spatial coherence. Accordingly, they may only be coupled efficiently to multimode optical fibers.

Thus, an FPI sensor 100 having an ultra-short FP cavity 106 thus provides an opportunity for interrogation by low-resolution spectrum analyzers or even simple color detection systems, while using simple low-coherence light sources like LEDs or incandescent light sources (e.g. tungsten light bulbs).

Finally, recent advances in all-fiber, all-silica FOS design and manufacturing, have provided opportunities for effective design and production of environmentally very stable, miniature, all-fiber FPIs. These concepts for sensor design and production can be, in many cases, modified in such a way as to provide sensors with ultra-short optical FP cavities 106.

The properties of FP sensors can be described by a few simple expressions. The reflectance $R_c$ of a short, low finesse, FP cavity, can be expressed as:

$$R_c = \frac{2R\left(1-\cos\left(\frac{4\pi}{\lambda}L\right)\right)}{1+R^2-2R\cos\left(\frac{4\pi}{\lambda}L\right)} \approx 2R\left(1-\cos\left(\frac{4\pi}{\lambda}L\right)\right) \quad (1)$$

where R represents the cavity surface's reflectivity, usually defined by Fresnel reflection in fiber FPIs, L is the cavity length, and λ the wavelength.

The positions of peaks $\lambda_m$ within the back-reflected optical spectrum can then be expressed as:

$$\lambda_m = \frac{4L}{(1+2m)} \quad m = 0, 1, 2 \ldots \quad (2)$$

where m denotes the peak-order, and L the cavity/resonator's length. The distance between the two neighboring spectral peaks, can be further expressed as:

$$\Delta\lambda_{m:m+1} = \frac{2L}{\left(m+\frac{1}{2}\right)\left(m+\frac{3}{2}\right)} \quad (3)$$

The spectral peak's positional shift due to the optical cavity length change (e.g. spectral sensitivity,) can be described as:

$$d\lambda_m = \frac{4}{(1+2m)}dL \text{ or } d\lambda_m = \frac{\lambda_m}{L}dL \quad (4)$$

and a full width at half-maximum amplitude (FWHM) for a peak of the order m, can be expressed as:

$$FWHM_{\lambda_m} = \frac{L}{\left(m+\frac{1}{4}\right)\left(m+\frac{3}{4}\right)} \quad (5)$$

The spectral sensitivity is thus inversely-proportional to the peak order m. For example, for m=1, a change of cavity length dL for 100 nm will produce a spectral peak shift dλ of about 133 nm, a typical value that can be easily resolved by existing, cost-efficient, miniature spectrometers. However, in order to take advantage of these high sensitivity low-order spectral peaks, they need to appear within a visible or near-inferred range, which can only be achieved by a drastic reduction in the initial FP cavity length, preferably down to or even below the operating optical wavelength range, as indicated by expression (2) above.

Ultra-short cavities (e.g., ultra-short FP cavity 106) produce large spectral peak shifts. In extreme case, for m=0 (in this case the peak wavelength corresponds to 4L), we obtain dλ=4dL. Since a typical low-cost spectrum analyzer provides only roughly nanometer resolution, a measurement system using optical sensors having such an ultra-short FP cavity 106 should provide length measurement resolutions within the range of a few hundred picometers.

Figure 2:
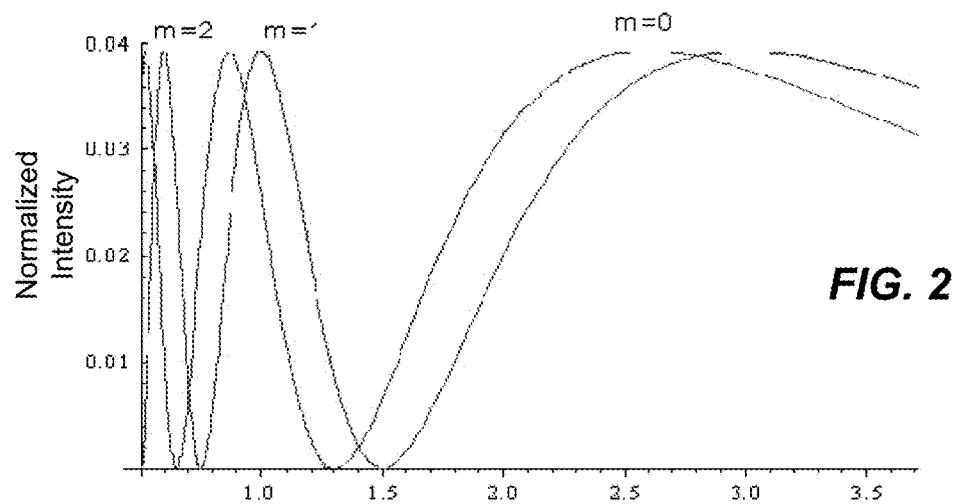
FIG. 2 illustrates the calculated spectra of a 0.75 μm long low-fines FP cavity and a 0.65 μm long low-fines FP cavity, each having a first-order peak within the spectrum (m=1) located at a wavelength corresponding to about 1 μm wherein the change in cavity length of 100 nm shifts the m=1 peak position by about 100 nm, according to some embodiments.

Short cavities also produce broad free-spectral ranges that allow for an unambiguous determination of cavity length, even in the cases of relative cavity length changes. FIG. 2 shows the modeled spectrum of a 0.75 μm-long low-fines FP cavity. The peak wavelength position of the first-order peak (m=1) corresponds to 1 μm. The neighboring peaks' wavelengths are located at 0.6 μm and 3 μm. Shortening of the cavity length by 100 nm, which corresponds to 13% of the initial cavity length, causes a peak of the order m=1 to move by 133 nm, to a new position that is still sufficiently far away from the original neighboring peaks' positions.

A demonstration of cavity length influence on the spectral characteristics of various short-cavity FP sensors, like optical sensor 100 are shown in FIG. 3 to FIG. 8. These figures show modeled spectral characteristics of cavities with various lengths within a wavelength range between about 400 nm and 1100 nm (e.g. typical working range of miniature, cost-efficient low-resolution, spectrometers). FIGS. 3 through 8 also demonstrate changes in the various cavities spectra when the absolute cavity lengths are increased by 100 nm. Ultra-short cavities, e.g. cavities with lengths below 2 μm, provide the lowest-order peaks of m<5 within a 400 nm to 1100 nm wavelength range. These figures also exhibit relatively large spectral peak shifts (e.g., that are greater than 0.4 nm per each nanometer of cavity length change). When the length of the cavity is reduced to below 1 μm, the number of peaks within the 400 nm to 1100 nm spectral range is further reduced and the lowest-order peaks, such as a second-order peak (m=2) with spectral sensitivity of about 0.85 nm/nm, appears within the 400 nm to 1100 nm wavelength range. Further reduction in cavity length can provide a presence of the two lowest (first and zero-order) spectral peaks (m=0 and m=1) within the 400 nm-1100 nm spectral range. The first-order peak's sensitivity is about 133 nm/nm. The zero-order peak (m=0) has the highest attainable spectral sensitivity, that corresponds to about 4 nm/nm. In order to take advantage of the first-order peak (m=1) within a 400 nm to 1100 nm spectral range, the cavity length may be reduced to or below about 0.75 μm. In order to use the zero-order peak (m=0) within a 400 nm to 1100 nm spectral range, a cavity's length may be reduced to about 0.25 μm.

Figure 3:
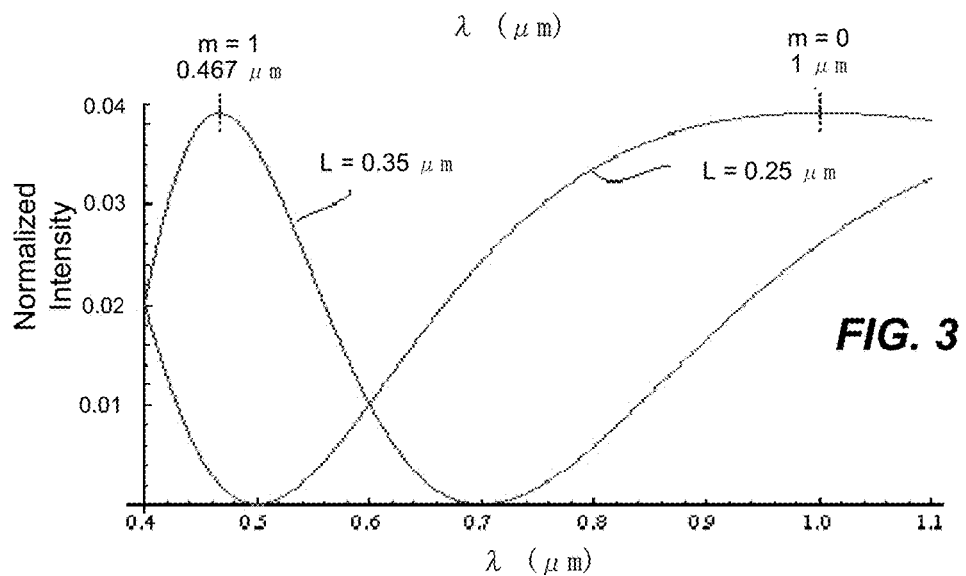
FIG. 3 illustrates a calculated spectrum of a 0.25 μm and 0.35 μm long low-fines FP cavities. The zero-order peak within the spectrum (m=0) of the 0.25 μm long cavity is located at a wavelength that corresponds to 1 μm. No other peak is present within a 400 nm-1100 nm range in case of the 0.25 μm long cavity. The first-order peak (m=1) of 0.35 μm long low-fines FP cavity is at 467 nm, all other spectral peaks are outside the 400 nm-1100 nm range, according to some embodiments.
Figure 4:
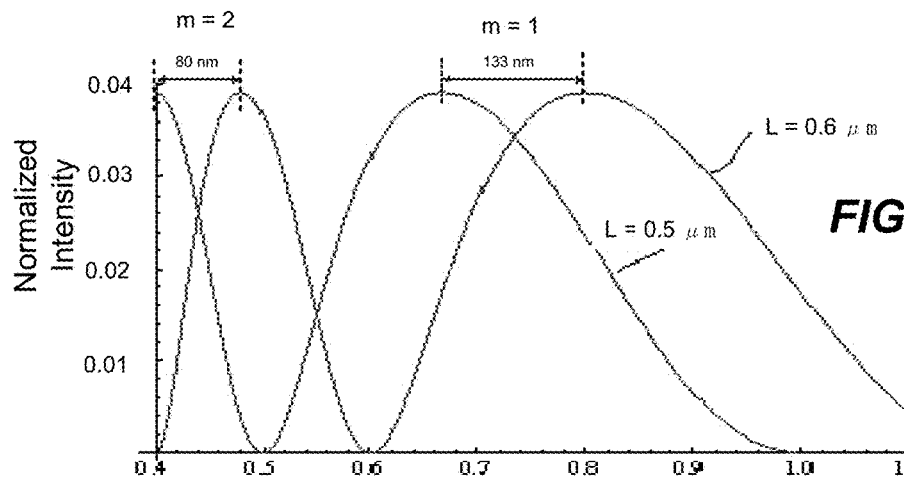
FIG. 4 illustrates the calculated spectra of the 0.5 μm and 0.6 μm long low-fines FP cavities. The first (m=1) and the second-order (m=2) peaks are present within a 400 nm-1100 nm wavelength range. A cavity length change from 0.5 μm to 0.6 μm causes the first order peak to shift by 133 nm, while the second order peak shifts by about 80 nm, according to some embodiments.
Figure 5:
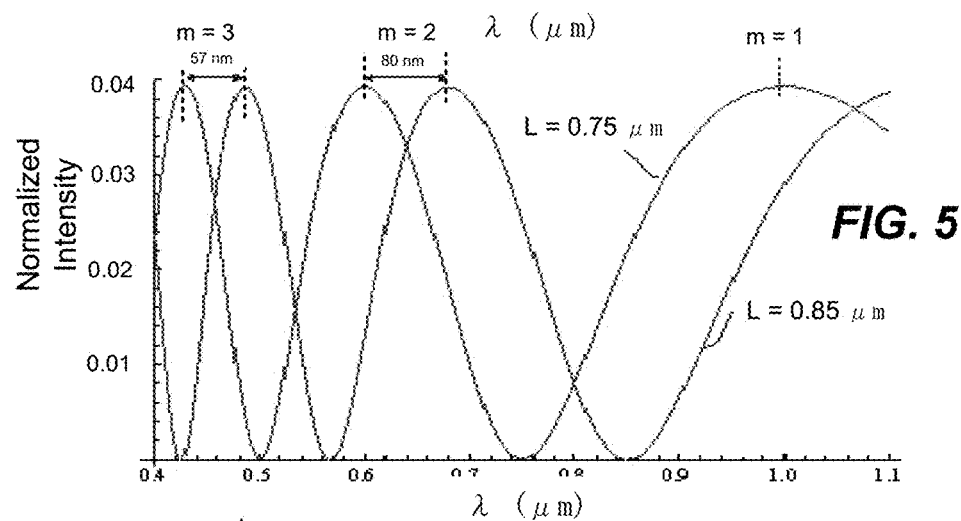
FIG. 5 illustrates the calculated spectra of the 0.75 μm and 0.85 μm long low-fines FP cavities. The first (m=1), the second (m=2), and the third (m=3) order spectral peaks are present within a 400 nm-1100 nm wavelength range. The cavity length change from 0.75 μm to 0.85 μm causes the second-order peak to shift by 80 nm, while the third-order peak shifts by about 57 nm, according to some embodiments.
Figure 6:
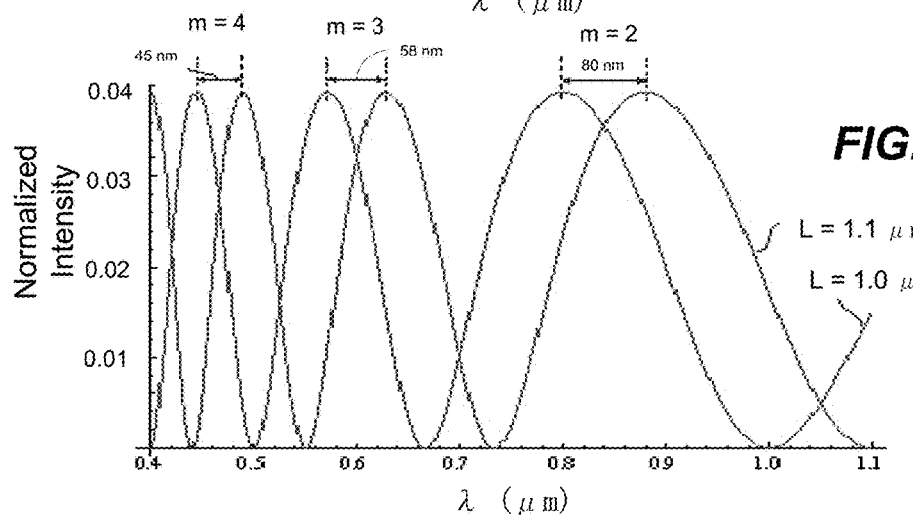
FIG. 6 illustrates the calculated spectra of 1 µm and 1.1 µm long low-fines FP cavities. The second (m=2), the third (m=3), and the fourth (m=4)-order spectral peaks are present within a 400 nm-1100 nm wavelength range. The cavity length change from 1 µm to 1.1 µm causes the second-order peak to shift by 80 nm, while the third and fourth-order peaks shift by about 58 nm and 46 nm, according to some embodiments.
Figure 7:
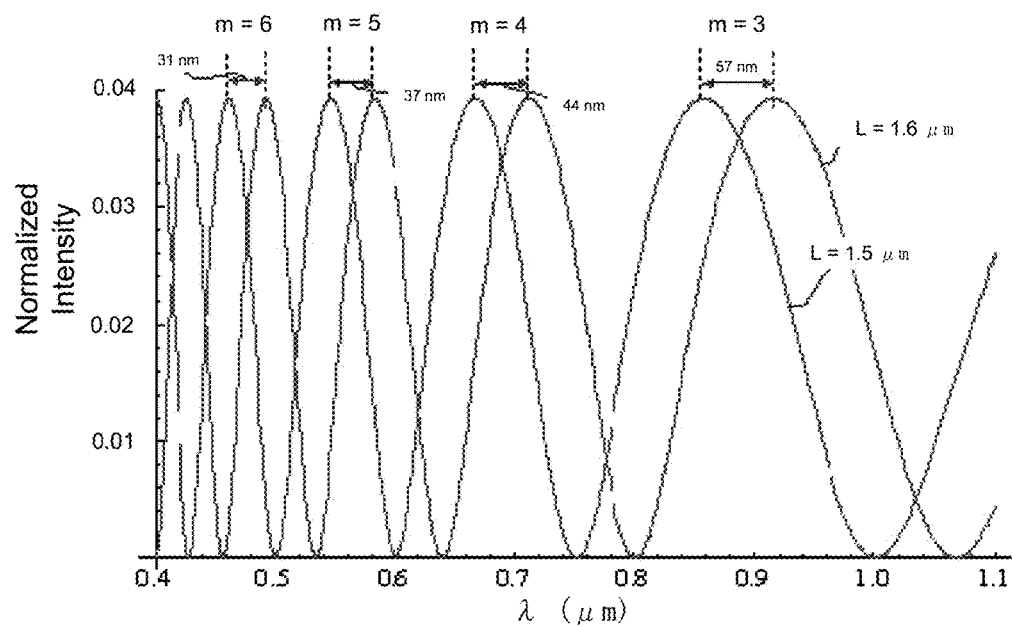
FIG. 7 illustrates the calculated spectra of the 1.5 µm and 1.6 µm long low-fines FP cavities. The third (m=3), the fourth (m=4), the fifth (m=5), and the sixth-order (m=6) spectral peaks are present within a 400 nm-1100 nm wavelength range. The seventh-order peak is also present within the same wavelength range in case of the 1.6 µm long cavity. The cavity length change from 1.5 µm to 1.6 µm causes the third, the fourth, the fifth and the sixth peaks to shift by 57 nm, 44 nm, 37 nm, and 31 nm, respectively, according to some embodiments.
Figure 8:
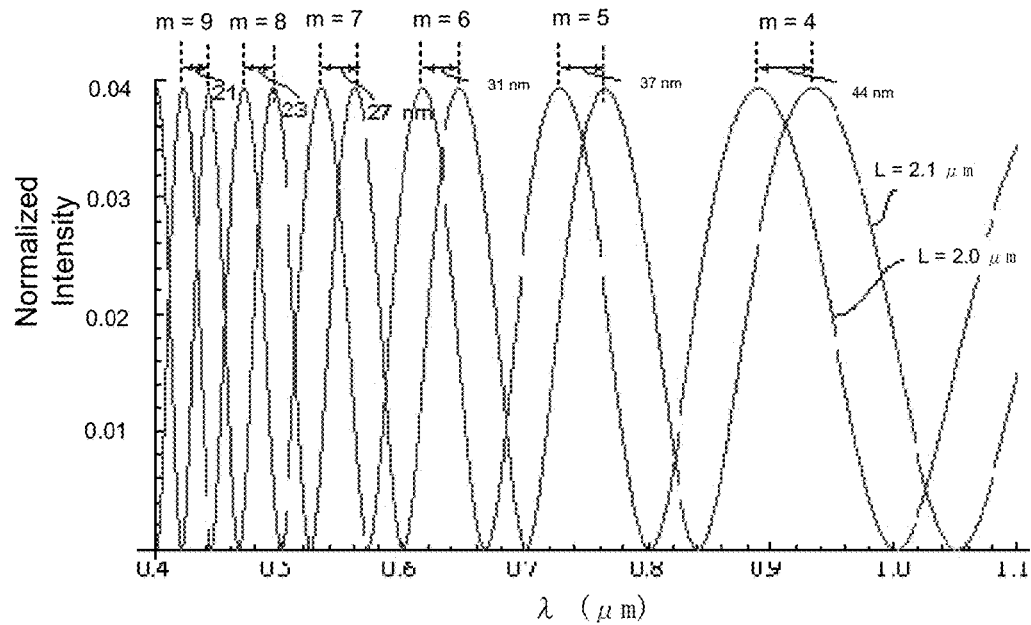
FIG. 8 illustrates the calculated spectra of the 2 µm and 2.1 µm long low-fines FP cavities. The fourth (m=4) to ninth-order (m=9) spectral peaks are present within a 400 nm-1100 nm wavelength range. The cavity length change from 2 µm to 2.1 µm causes the spectral peaks to shift from between 44 and 21 nm, according to some embodiments.

FIG. 3 also demonstrates that FP sensors 100 having a cavity length change from 0.35 μm to 0.25 μm may cause a complete change or reversal of the entire spectral characteristics. The 0.35 μm-long cavity strongly reflects short wavelengths, while producing a reduction in the cavity length by only 100 nm, suppressing the reflection of the short portion of the spectrum, and promoting longer wavelengths reflection. In one or more embodiments, such changes can be directly detected/measured by simple color detection systems, such as RBG sensor or similar color-detection sensors, which are far less complex and lower-cost than spectrum analyzers. Systems including color detection apparatus and FP optical sensors having a cavity length change from 0.35 μm to 0.25 μm might not only be limited to zero-order peak observation, but also to the observation of spectra that might contain a few lower-order peaks, like m=1 or perhaps even m=2.

Table 1 below summarizes a few more typical properties of ultra-short FP cavity length spectral characteristics.

TABLE 1

Positions of spectral peaks and FWHM at m = 1 for a few exemplary FPI sensor with ultra-short FP cavities

| L (μm) | $\lambda_{m=0}$ (μm) | $\lambda_{m=1}$ (μm) | $\lambda_{m=2}$ (μm) | $FWHM_{\lambda_{m=1}}$ (μm) |
|---|---|---|---|---|
| 0.25 | 1 | 0.33 | 0.2 | 0.114 |
| 0.5 | 2 | 0.67 | 0.4 | 0.228 |

TABLE 1-continued

Positions of spectral peaks and FWHM at m = 1 for
a few exemplary FPI sensor with ultra-short FP cavities

| L (μm) | $\lambda_{m=0}$ (μm) | $\lambda_{m=1}$ (μm) | $\lambda_{m=2}$ (μm) | FWHM$_{\lambda_{m=1}}$ (μm) |
|---|---|---|---|---|
| 0.75 | 3 | 1.00 | 0.6 | 0.340 |
| 1.0 | 4 | 1.33 | 0.8 | 0.457 |

In summary, optical sensors having ultra-short FP cavities (e.g., optical sensor 100) may be used to provide for high-resolution measurements of optical path-length changes, while using cost-effective, low-resolution spectrum analysis systems operating within a visible and near-infrared range (e.g., 400 nm to 1100 nm). Furthermore, the application of ultra-short cavity FP interferometers allows for the usage of multimode lead-in fibers, which may allow for reasonably effective coupling of light from low-cost, ultra-broadband sources (e.g., LED and other low-cost light sources). Furthermore, in some embodiments, spectrum analyzers can be replaced by even simpler systems, such as color analysis devices that can simultaneously detect light-intensity at more than one wavelength. For example Red, Green, and Blue (RGB) detectors may be used that can simultaneously detect light-intensity at three different wavelengths. Such RGB detectors are widely available in the form of a single chip, and can be utilized to perform such color analysis. Other types of color sensors or detectors may be used. In this case, ratios between individual color channels or other signal processing algorithms can be used to determine the cavity length change. Lower-order FP cavities (e.g., m=0 and m=1) are best-suited for such applications as they generate optical spectra, which extend across the entire or most of the wavelength range covered by the RBG detector. RBG detectors that provide non-filtered light detection channels or additional color channels can also be used (e.g., RGBY sensors).

With respect to the above analysis, ultra-short cavity Fabry-Perot optical fiber sensors, as further defined above, are sensors that have initial cavity lengths between surfaces of the cavity walls 108 and 109 that are shorter than 2.5 μm, shorter than 1.5 μm in some embodiments, and shorter than 1 μm in other embodiments. These ultra-short cavity lengths allow for spectral interrogation of the cavity length changes by observation of the cavity spectral characteristics within the wavelength range in which cavities' spectral peaks of the order m=0 to m<5 occur during the operation of the sensor.

Figure 9:
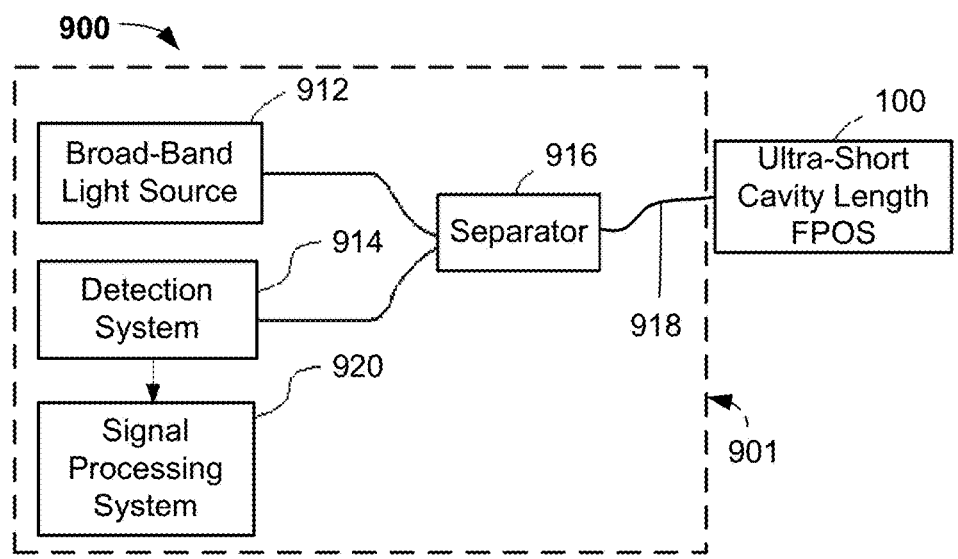
FIG. 9 illustrates the basic configuration of a sensing system having a broad-band light source coupled to a multimode fiber, which is further connected to a separator such as a multimode coupler according to some embodiments. The separator is further connected to an ultra-short cavity Fabry-Perot sensor, and the spectrum-analysis system, according to some embodiments.

According to embodiments of the present invention, the optical system 900, shown in FIG. 9 consists of an ultra-short cavity Fabry-Perot optical sensor such as the sensor 100 described above, which changes in cavity length under the influence of a measured parameter (e.g., under strain, load, pressure, temperature or the like), and an optical interrogation system 901. The optical interrogation system 901 includes a broad-band light source 912, a spectrally-sensitive detection system 914 that has low resolution (e.g., resolution of 0.5 nm or worse) and can resolve or analyze at least part of the optical spectrum emitted by a broad-band light source 912, an optical separator 916 (e.g., an optical coupler or beam splitter) that directs optical radiation from the broad-band light source 912 to the ultra-short cavity Fabry-Perot optical sensor 100 and back to the spectrally-sensitive detection system 914, a multimode optical fiber 918 that interconnects with at least an ultra-short cavity Fabry-Perot optical sensor 100 and optical separator 916, and a signal processing system 920 (e.g., electronics and/or micro computer based signal processing system) that can analyze and process signals generated by spectrally-sensitive detection system 914. Optical fiber 922 may also interconnect the broad-band light source 912 and the optical separator 916 and spectrally-sensitive detection system 914. The spectrally-sensitive detection system 914 can be any type of spectrum analyzer, such as grating-based spectrum analyzer, MOEMS or MEMS-based spectrum analyzer, or any other device that can analyze optical spectra. The spectral resolution of such a spectrum analyzer can be relatively low, such as within the range of 0.5 nm to 10 nm.

The ability to use a spectrally-sensitive detection system 914 having such low spectral resolution is due to the high spectral sensitivity of ultra-short Fabry-Perot cavity optical sensors 100 that provide significant changes in spectral characteristics, even at small changes in cavity lengths. Furthermore, spectrally-sensitive detection system 914 can be comprised of two or more spectrally-sensitive detectors with two or more shifted peak-sensitivity wavelengths, such as RGB sensor, an improved RGB sensor, or other multi-color optical sensor or multi-color detector. The broad-band light source 912 can be an optical source, such as a light bulb, a xenon-filled light bulb, or a broad-band light-emitting diode (LED). Other broad band light sources may be used. Broad-band source, as used herein means a light source that emits an optical spectrum having a Full Width at Half Maximum amplitude (FWHM) of greater than about 250 nm, greater than about 500 nm, or even more, and that emits wavelengths within range of between about 350 nm and about 1100 nm.

The ultra-short Fabry-Perot cavity optical sensor 100 is an optical sensor having an optical cavity length that is shorter than 2.5 μm, shorter than 1.5 μm, or even shorter than 1 μm. The initial (un-stressed) cavity length of the ultra-short cavity Fabry-Perot optical sensor 100 should be such that at least one of the zero-order (m=0), first-order (m=1), second-order (m=2), third-order (m=3), fourth-order (m=4) or fifth-order (m=5) peaks coincides with the operating wavelength range of spectrally-sensitive detection system 914 and broad-band light source 912. Such optical sensors 100 may exhibit relatively high spectral sensitivity, e.g. have a spectral peak shift as a consequence of cavity length change that is 400 μm per nanometer (nm) of cavity length change or more. In some embodiments, when observing first-order cavity peak (m=1) shifts, the spectral peak sensitivity may be over 1 nm per 1 nm of the cavity length change. Furthermore, in another preferred case of zero-order peak (m=0) tracking/observation, the peak position can change by approximately 4 nm per each nm of actual cavity length change.

Optical sensors 100 having ultra-short cavity lengths at or around optical wavelengths in visible and near-infrared ranges should have properties of dimensional and thermal stability within nanometer range. Secondly, the ultra-short cavity initial cavity length should provide nanometer resolution, in order to obtain the desired initial spectral response, that is 1 nm or more response for each nm of length change. Finally, in spite of ultra-short cavity length, the sensor should remain sensitivity to the measured parameter (e.g., strain, temperature, pressure, or the like).

While there are many methods for producing fiber-optic Fabry-Pert sensors, including, MEMS and MOEMS, laser and other micromachining technologies, methods that allow the production of all-silica, all-fiber sensors may be best-suited for the realization of ultra-short cavity sensors as described herein. Such sensor examples are described in U.S. Pat. No. 7,684,657, in U.S. patent application Ser. No. 13/046,648 entitled "Optical Fiber Sensors Having Long Active Lengths, Systems, And Methods," filed on Mar. 11, 2012," and in "All-fiber, long-active-length Fabry-Perot strain sensor. Opt. express", 2011, vol. 19, no. 16, pp. 15641-15651 by Pevec and Donlagic, the disclosures of all of which are hereby incorporated by reference in their entirety herein. These types of optical sensors may be manufactured to mostly meet all the above requirements. All-silica optical sensor design provides good thermal and environmental stability. Furthermore, since these optical sensors may be assembled by fusion-splicing, the latter eliminates using potentially thermally and chemically unstable bonding materials.

Figure 11:
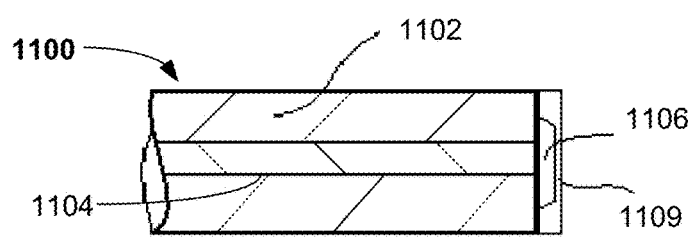
FIG. 11 illustrates an all-silica, all-fiber pressure sensor having an ultra-short FP cavity, according to some embodiments.

The production, testing, and interrogation of several exemplary ultra-short cavity FP sensors will now be described. The first optical sensor 1100 is a pressure sensor and is derived from the sensors described in U.S. Pat. No. 7,684,657. The optical sensor 1100 is shown in FIG. 11 and consists of lead-in fiber 1102 and a diaphragm 1109 positioned in the front of the core 1104 of the lead-in fiber 1102. The end-surface of the lead-in fiber 1102 and the diaphragm 1109 form an ultra-short FP cavity 1106. The cavity length of the ultra-short FP cavity 1106 is shorter than 2.5 µm, shorter than 1.5 µm in some embodiments, and shorter than 1 µm in other embodiments. The diaphragm 1109 may be attached to the lead-in fiber 1102 via a spacer or other like structure. In some embodiments, the spacer and diaphragm 1109 may be formed as a single-piece optical element and made of silica glass. The optical sensor 1100 may be produced by micromachining process that is based on selective etching using specially produced sensor-forming fiber. This fiber may have a large doped (step index) core that etches at a higher rate than pure silica when exposed to hydrofluoric acid (HF), which forms a cavity at the tip of the fiber after wet-etching. The etching time and dopant concentration are used to control the initial cavity depth. This etched fiber is then fusion-spliced to the lead-in fiber 1102 (e.g., a telecommunication optical fiber having a 50 um outer glass diameter) to form the FP cavity 1106. The etched fiber is cleaved near the splice and polished to obtain a pressure-sensitive diaphragm 1109. Furthermore, the lead-in fiber 1102 containing the diaphragm and cavity may be etched in order to increase a sensitivity of the sensor 1100 to at least 500 nm/bar. This process is described in detail in U.S. Pat. No. 7,684,657 and may be used to yield cavity lengths of the order described herein (e.g., less than 2.5 µm).

Figure 10:
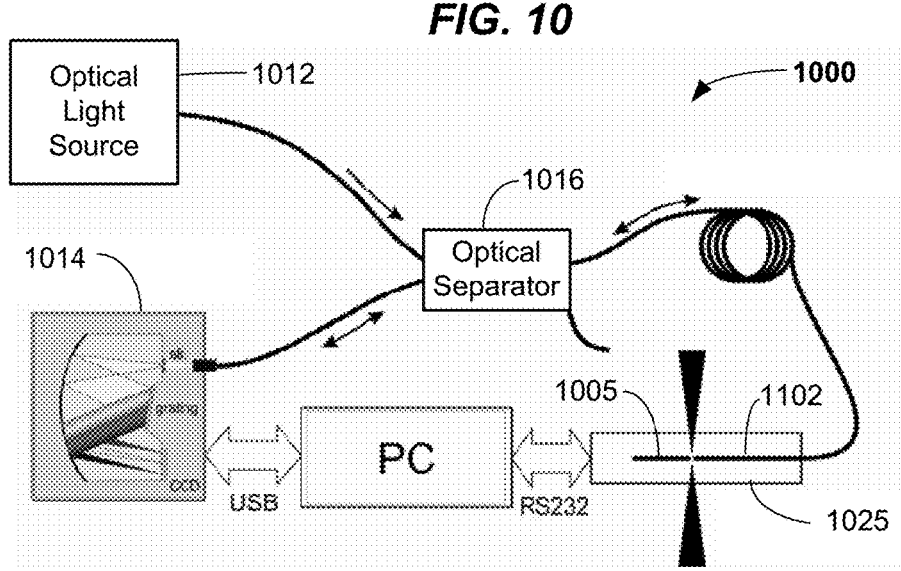
FIG. 10 illustrates a feedback-assisted fusion-splicing system used for the production of ultra-short FP cavities, according to some embodiments.

To further reduce the cavity length to a within a sub-micrometer range, the etching time of the sensor-forming fiber may be shortened to obtain an initial cavity depth of less than about 2.5 µm. Furthermore, an active, feedback-assisted, splicing process and apparatus may be applied. The apparatus 1000, as shown in FIG. 10, includes a computer-controlled filament fusion splicer 1025 (e.g., a Vytran FSS 2000), a low-resolution spectrum analyzer 1014 (E.G., A Hamamatsu C11007MA), an optical separator 1016 (e.g., a 3-dB coupler), and a tungsten-filament light bulb as an optical light source 1012. The etched sensor-forming fiber 1005 is fusion-spliced to the lead-in fiber 1102 while carrying out on-line observation of the back-reflected spectra.

Figure 12:
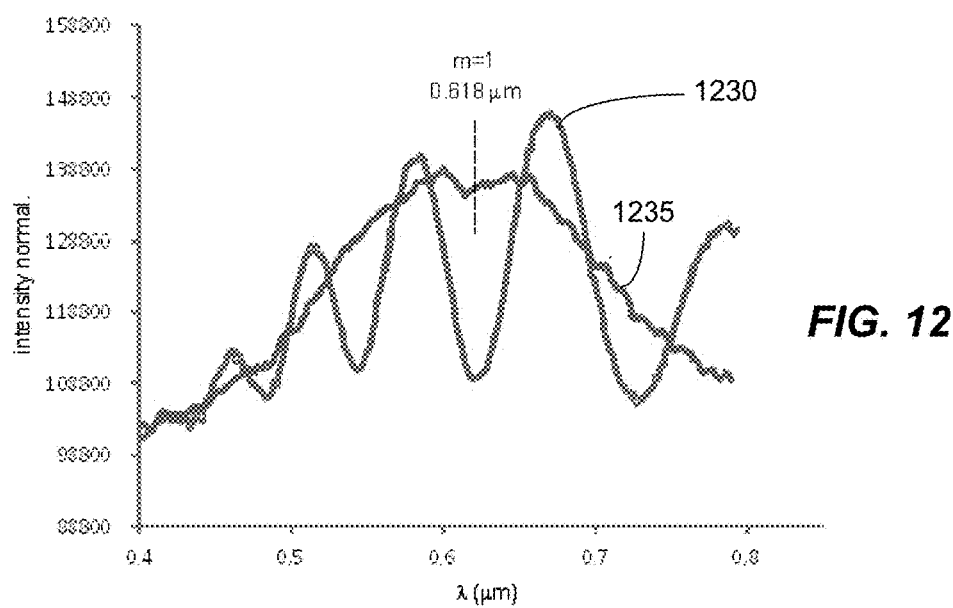
FIG. 12 illustrates a measured FP cavity optical spectrum obtained before and after completion of the splicing process according to some embodiments. The spectrum before splicing was obtained by axially depressing a lead-in fiber and an etched sensor-forming fiber together by the application of the fusion splicer's axial motors, according to some embodiments.

The fusion process consists of the usual fusion splicing steps with the addition of a final cavity length-tuning step. During this tuning step the fusion temperature is reduced, whilst commanding the fusion splicer's longitudinal motors to gradually compress the splice/cavity. The fusion process is terminated when a desired sensor spectra/length has been obtained. This additional step may be used to directly produce submicron cavity lengths, by a combination of initial shallow-etching of the sensor-forming fiber 1005 and length control between the cavity surfaces during such active fusion-splicing. The active fusion process enables precision-tuning of the initial cavity length and, consequently the spectral peak's position. FIG. 12 shows optical spectra of the cavity (e.g., FP cavity 1106) before and after splicing. The spectrum before splicing as designated by line 1230 is obtained by compressing the lead-in fiber 1102 and etched sensor-forming fiber 1005 before initiating the fusion process to a first length. The spectrum indicates a first cavity length of about a 1.9 µm. During splicing, the FP cavity 1106 is compressed until the first-order peak (m=1) appears within the spectral range of the spectrum analyzer. The spectrum after splicing as designated by line 1235. The spectrum indicates a second cavity length after splicing of about a 0.46 µm. The remaining part of the sensor production process may be the same as described in U.S. Pat. No. 7,684,657, including the final etching to achieve sensitivity of about 500 nm/bar or more.

Figure 13A:
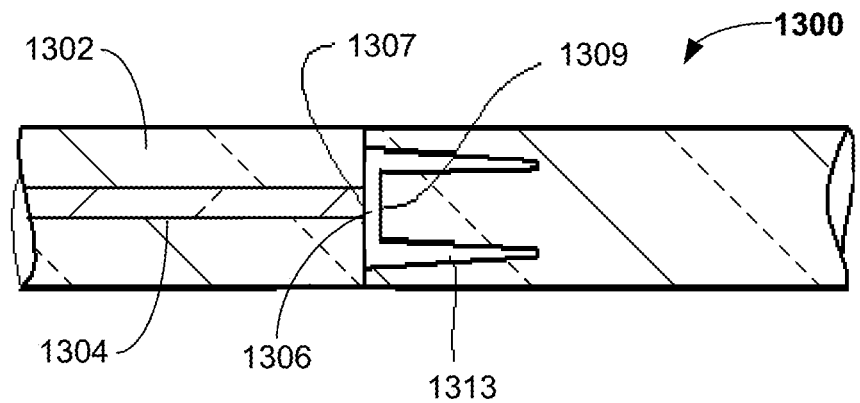
FIG. 13A illustrates an all-silica, all-fiber, long active length, but ultra-short cavity strain sensor, according to some embodiments.

A second ultra-short cavity FPI sensor as shown in FIG. 13A is a strain sensor. In order to obtain relatively high-strain sensitivity, an active length and the cavity length need to be separated; otherwise the cavity length also determines the active length. Such a design can be achieved either by fiber-in-capillary or fiber-in-ferule designs, as described in U.S. Pat. No. 5,301,001, for example, or by proper micro-machining of the optical fiber. The micromachining can be a particularly suitable method for the design and production of an ultra-short cavity sensor as, for example, described in "Optical Fiber Sensors Having Long Active Lengths, Systems, And Methods," filed on Mar. 11, 2012, and in "All-fiber, long-active-length Fabry-Perot strain sensor. Opt. express", 2011, vol. 19, no. 16, pp. 15641-15651 by Pevec and Donlagic.

A side view of such a sensor 1300 is shown in FIG. 13A. This sensor consists of a FP cavity 1306, defined by an end surface 1307 of a core 1304 of a lead-in fiber 1302, a micro-machined retracted sensor-forming fiber-end surface 1309, and a deep gutter 1313 that surrounds the retracted fiber-end surface 1309. This optical sensor 1300 is micro-machined out of a specially designed sensor-forming fiber that consists of a central part, which is lightly doped with dopant that has a limited effect on the etching rate (for example by $TiO_2$). This central part may be further surrounded by a phosphorus pentoxide-doped ring, which strongly increases an etching rate of the silica (typically by over 40 times over pure silica etch rate) when exposed to HF. Wet-etching of such fiber in an acid (e.g., HF) may result in a structure that consists of the slightly retracted fiber-end 1309, which is further surrounded by the deep gutter 1313. The fusion of such an etched fiber with lead-in fiber 1302 yields an optical strain sensor 1300 that has an active length determined by gutter depth, whilst the cavity length can almost be arbitrary and is settable by dopant-level control within the central portion of the sensor-forming fiber.

Figure 13B:
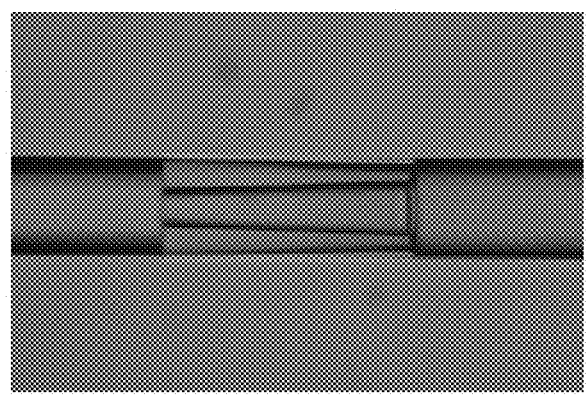
FIG. 13B illustrates an optical microscopic photograph of an exemplary produced sensor, according to some embodiments.

The ultra-short FP cavity strain sensor 1300 that utilizes an ultra-short cavity length (e.g., less than about 2.5 µm) may be produced by same method as described above. However, the sensor-forming fiber may be optimized for ultra-short cavity production. In particular, the optimized sensor-forming fiber used has identical parameters to those reported in the above-cited Donlagic and Pevec reference, except that it may reduce the TiO2 concentration in the central region to about 1.5 mol % or less, in order to reduce any retraction of the central part of the fiber during etching. Furthermore, the feedback assisted, fine-tuning step during the splicing process may be added in the same way as when producing pressure-sensors, as described previously. FIG. 13B illustrates and actual micrograph of such an optical sensor 1300.

Figure 14:
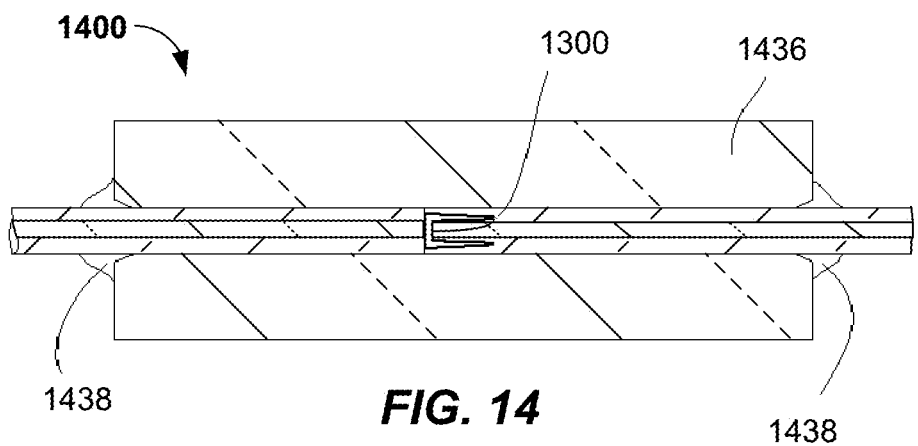
FIG. 14 illustrates the temperature sensor based on the ultra-short cavity strain sensor, according to some embodiments.

A simple temperature-sensor 1400, as shown in FIG. 14, may be provided by application of the above described strain sensor 1300 and fixing (e.g., gluing) the strain sensor 1300 into a ferula 1436 (e.g., a zirconia ferula). The ferula 1436 may have a 1.25 mm diameter, for example. The fibers coupled to the sensor 1300 may be fixed on each side of the ferula with an adhesive 1438 (e.g., epoxy). The ferula 1436 may be about 10.5 mm in length. Zirconia has a relatively large coefficient of thermal expansion (CTE), e.g. $10^{-5}$ $K^{-1}$, which is significantly higher than the CTE of silica ($5 \times 10^{-7}$ $K^{-1}$). The temperature change of the ferula 1436 thus induces strain on the strain sensor 1300 fixed in the ferula 1436. The length of the cavity of the sensor 1300 may be less than 2.5 μm.

Several experimentally produced examples of sensors were tested for pressure, strain, and temperature responses. All the initial sensor cavity lengths were set to allow observation of the first-order spectral peaks (e.g. m=1) within the visible band of the optical spectrum. Any gradual increases in the pressure, strain, and temperature causes these spectral peaks/fringes to shift, as indicated in FIGS. 15-20.

Figure 15:
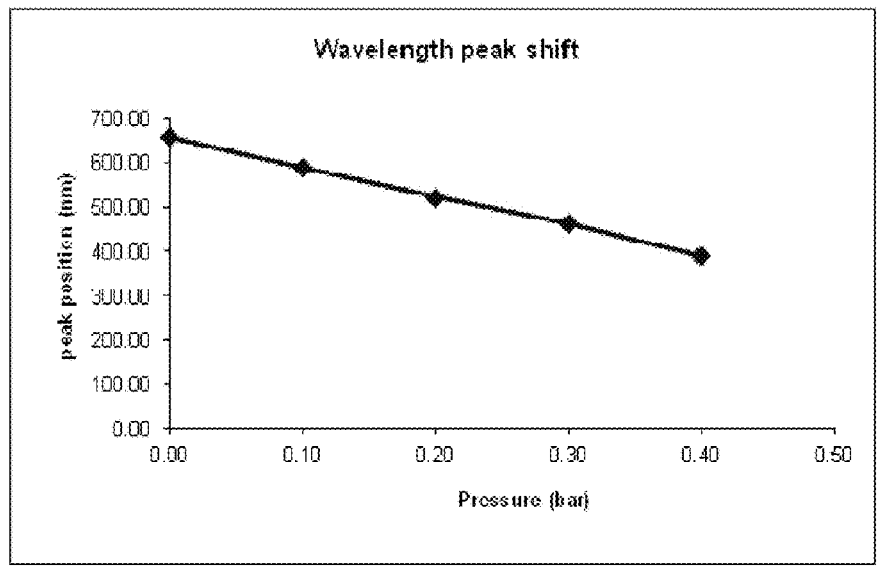
FIG. 15 illustrates a measured spectral peak shift of a produced exemplary pressure-sensor, wherein a pressure spectral sensitivity of greater than 500 nm/bar (e.g., about 667 nm/bars) was obtained, according to some embodiments.

FIG. 15 illustrates a first-order (m=1) spectral peak shift (nm) versus applied pressure (bar) of one produced exemplary pressure sensor having an ultra-short cavity length. The experimentally measured pressure spectral sensitivity was greater than about 500 nm/bar (e.g., about 667 nm/bar).

Figure 16:
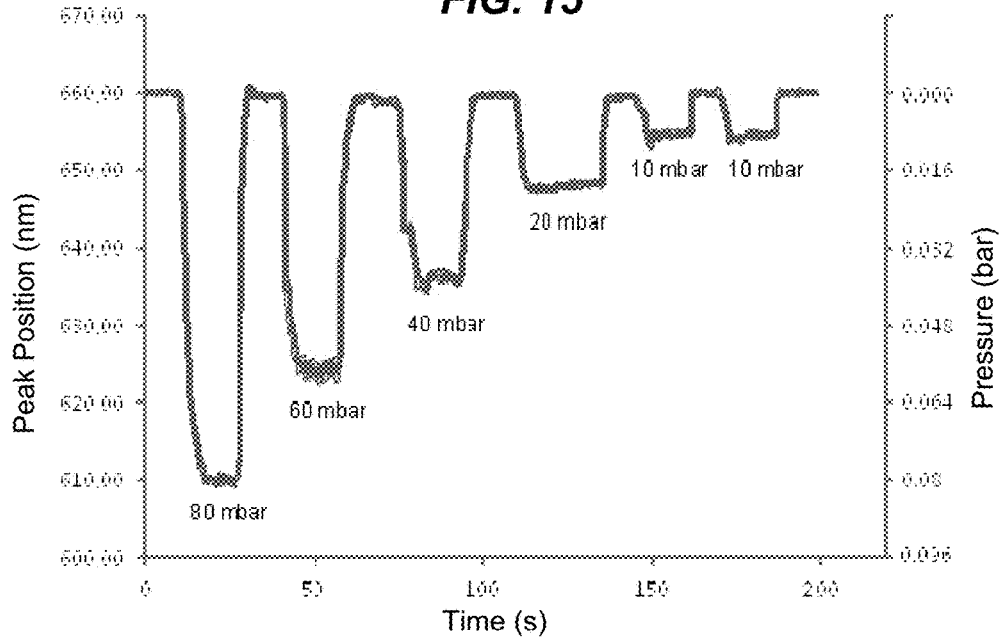
FIG. 16 illustrates a measured pressure response of an optical pressure sensor having an ultra-short cavity according to some embodiments using a miniature spectrometer (Hammatsu C11007MA), and a peak-tracking algorithm. A sensor-system resolution of better than 10 nm/bar was achieved, according to some embodiments.

FIG. 16 demonstrates a measured response of a pressure sensor having an ultra-short cavity as described above when the pressure was changed (increased and then decreased) to 10, 20, 40, 60, and 80 mbar. The sampling rate was 1 Hz, the used spectrum analyzer was a Hammatsu C11007MA, the lead-in fiber was 50 μm telecom multimode fiber, and a tungsten bulb was used as a broad-band light source. FIG. 16 indicates that a resolution significantly better than 10 mbar can be obtained.

Figure 17:
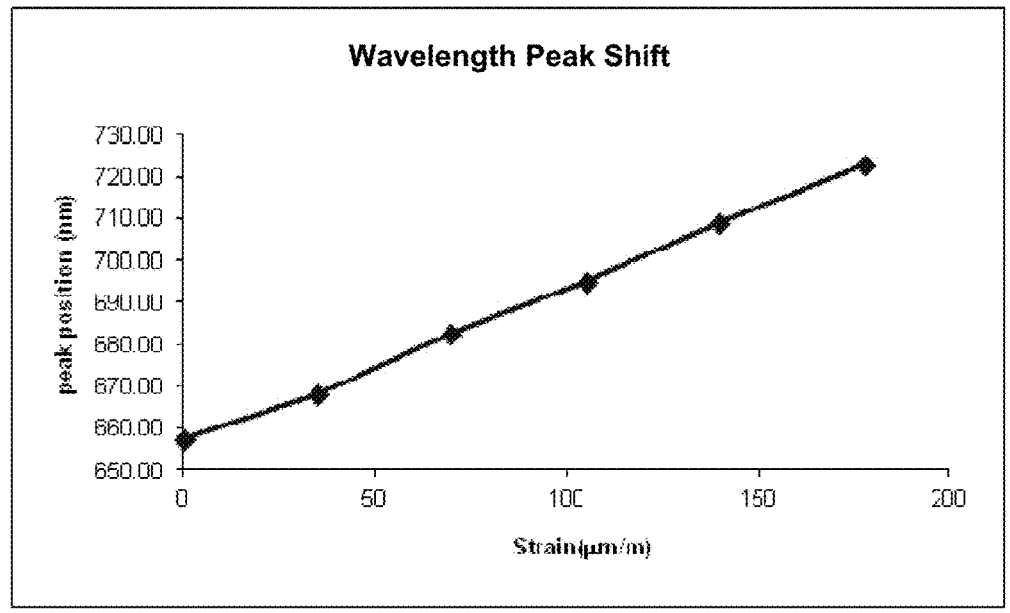
FIG. 17 illustrates a measured spectral peak-shift of the produced exemplary strain-sensor having an ultra-short cavity according to some embodiments. A strain sensitivity of greater than about 0.30 nm/µε (e.g., about 0.37 nm/µε) was obtained, according to some embodiments.

FIG. 17 shows a first-order (m=1) spectral-peak shift (nm) versus applied strain (μm/m) of a produced exemplary strain sensor having an ultra-short cavity length as described above. The spectral sensitivity to the strain was approximately 0.37 nm/με (about 0.37 nm/(μm/m)).

Figure 18:
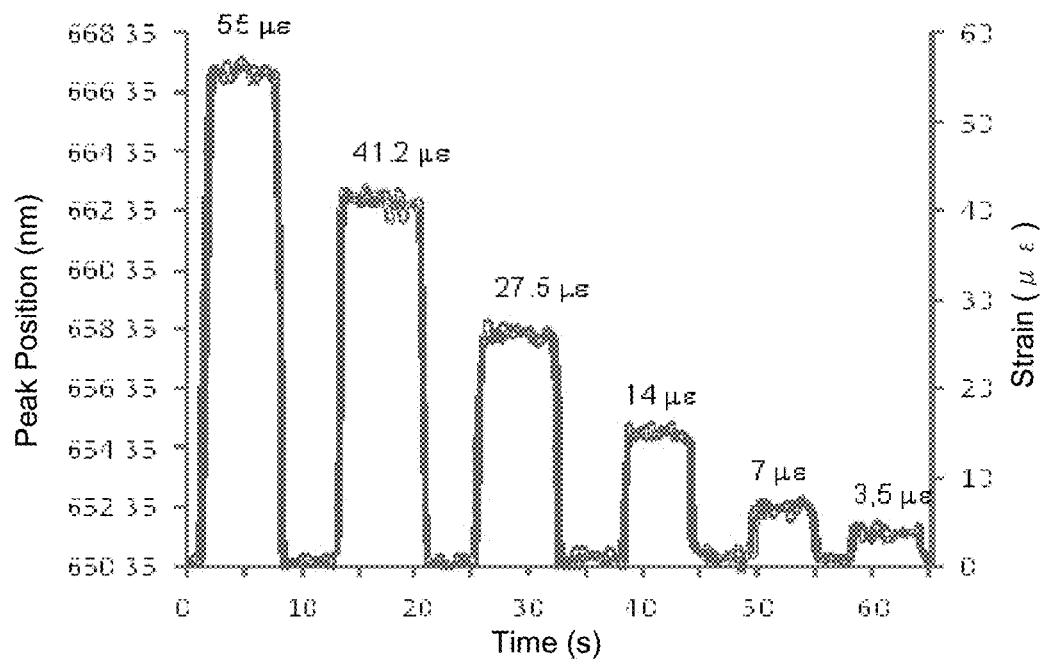
FIG. 18 illustrates a response of a strain sensing system having an optical strain sensor having an ultra-short cavity to different strain loads using a miniature spectrometer (Hammatsu C11007MA), and a peak-tracking algorithm, according to some embodiments.

FIG. 18 demonstrates the measured response of the strain sensor when cyclically exposed to various loads causing strain variations. The sampling rate was 1 Hz, the used spectrum analyzer was a Hammatsu C11007MA, the lead-in fiber was 50 um telecom multimode fiber, and a tungsten bulb was used as the broad-band light source. FIG. 18 indicates that a resolution of better than 3με can be achieved (about 0.37 nm/(μm/m)).

Figure 19:
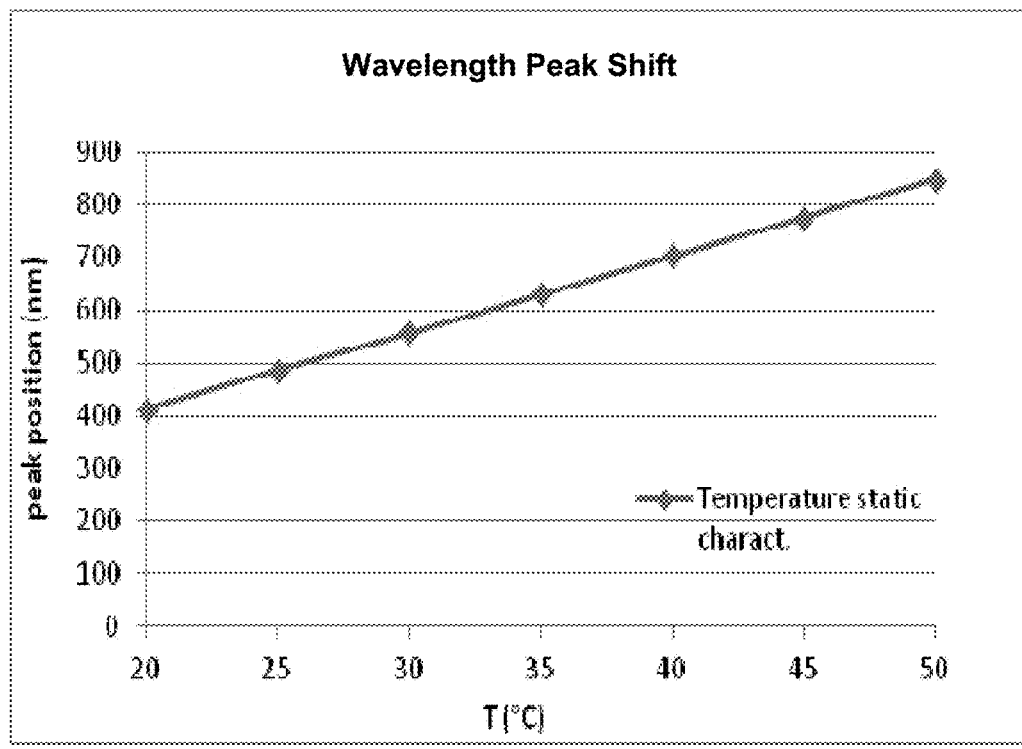
FIG. 19 illustrates a measured spectral-peak shift of the produced exemplary temperature sensor, according to some embodiments.

FIG. 19 shows the first-order (m=1) spectral-peak wavelength shift (nm) versus applied temperature (° C.) of a produced exemplary temperature sensor having an ultra-short length cavity as described above. The spectral-sensitivity to the strain was greater than about 8 nm/° C., or even greater than about 10 nm/° C., and about 14 nm/° C. in the depicted embodiment.

The results shown above in FIGS. 15, 17 and 19 and other plots were obtained by simple tracking of spectral peaks. In such simple cases unambiguous cavity length measurement ranges may be limited by the resonators' free spectral-ranges. This is particularly valid for long FP cavities, when a change in resonator length for one half of the wavelength reproduces nearly identical spectral characteristics that cannot be easily distinguished amongst each other. It should be understood that in ultra-short cavity FP sensors, a free spectral-range does not impose such a limitation. In ultra-short cavity sensor change in cavity length for halves of the wavelengths induces significant changes within the spectral footprint that can be easily recognized by simple algorithms. For example, a cavity with a length of 0.5 μm has very different spectral characteristics from a 1 μm long cavity, as indicated for example in FIGS. 4 and 6. Proper signal-processing algorithms can be easily applied, and can provide continuous measurements of cavity length changes in excess of one or multiple half-wavelengths.

The foregoing description discloses only exemplary embodiments of the invention. Modifications of the above-disclosed apparatus, systems, and methods which fall within the scope of the invention will be readily apparent to those of ordinary skill in the art. Accordingly, while the present invention has been disclosed in connection with exemplary embodiments thereof, it should be understood that other embodiments may fall within the scope of the invention, as defined by the following claims.

The invention claimed is:

1. An optical system, comprising:
   an optical sensor having an ultra-short Fabry-Perot cavity, wherein the ultra-short Fabry-Perot cavity comprises a cavity length of shorter than 2.5 μm; and
   an optical interrogation system coupled to the optical sensor and operational to send light signals to the optical sensor and receive light signals from the optical sensor within a wavelength range of at least between 400 nm to 1100 nm, which includes visible and near-infrared range, wherein the optical interrogation system comprises a spectrally-sensitive detection system having a color detector adapted to receive the light signals and simultaneously detect light-intensity at more than one wavelength.

2. The optical system of claim 1, wherein the color detector comprises a multi-color detector.

3. The optical system of claim 1, wherein the color detector comprises a multi-color optical sensor.

4. The optical system of claim 1, wherein the color detector comprises an RGB sensor.

5. The optical system of claim 1, wherein the color detector comprises an RGBY sensor.

6. The optical system of claim 1, wherein the color detector is configured to detect light intensity at three different wavelengths.

7. The optical system of claim 1, wherein the optical interrogation system is configured to determine ratios between individual color channels.

8. The optical system of claim 1, wherein the color detector and cavity length are configured to detect a zero-order peak within the wavelength range of at least between 400 nm to 1100 nm.

9. The optical system of claim 1, wherein the color detector and cavity length are configured to detect a first-order peak within the wavelength range of at least between 400 nm to 1100 nm.

10. The optical system of claim 1, wherein the color detector and cavity length are configured to detect a second-order peak within the wavelength range of at least between 400 nm to 1100 nm.

11. The optical system of claim 1, wherein the color detector and cavity length are configured to detect lower-order peaks within the wavelength range of at least between 400 nm to 1100 nm.

12. The optical system of claim 1, wherein the cavity length is shorter than 1.5 μm.

13. The optical system of claim 1, wherein the cavity length is shorter than 1.0 µm.

14. The optical system of claim 1, wherein an initial cavity length of the optical sensor is of a length such that at least one of a zero-order (m=0), a first-order (m=1), a second-order (m=2), a third-order (m=3), a fourth-order (m=4), or a fifth-order (m=5) peak coincides with an operating wavelength range of between 400 nm to 1100 nm.

15. The optical system of claim 1, wherein when observing a first-order cavity peak (m=1) shift, the optical sensor has a spectral peak sensitivity of over 1 nm per 1 nm of cavity length change in nm.

16. The optical system of claim 1, wherein the optical sensor has a spectral peak shift, as a consequence of a cavity length change, of 400 µm per nanometer or more, and the optical interrogation system has a spectral resolution of between 0.5 nm and 10 nm.

17. An optical system, comprising:
an optical sensor having an ultra-short Fabry-Perot cavity, wherein the ultra-short Fabry-Perot cavity comprises a cavity length of shorter than 2.5 µm;
multimode lead-in fibers coupled to the optical sensor; and
an optical interrogation system coupled to the optical sensor and operational to send light signals to the optical sensor and receive light signals from the optical sensor within a wavelength range of at least between 400 nm to 1100 nm, which includes visible and near-infrared range, wherein the optical interrogation system comprises a spectrally-sensitive detection system having a color detector adapted to receive the light signals and simultaneously detect light-intensity at more than one wavelength.

18. An optical system, comprising:
an optical sensor having an ultra-short Fabry-Perot cavity, wherein the ultra-short Fabry-Perot cavity comprises a cavity length of shorter than 2.5 µm;
an optical interrogation system coupled to the optical sensor and operational to send light signals to the optical sensor and receive light signals from the optical sensor within a wavelength range of at least between 400 nm to 1100 nm, which includes visible and near-infrared range, wherein the optical interrogation system comprises a spectrally-sensitive detection system having a color detector adapted to receive the light signals and simultaneously detect light-intensity at more than one wavelength; and
a broad-band light source operational to send the light signals.

* * * * *